May 21, 1957 T. NOVOSEL 2,792,728
COUNTER-CUTTING TOOL
Filed May 13, 1955 2 Sheets-Sheet 1

INVENTOR.
THOMAS A. NOVOSEL
BY
Oberlin & Limbach
ATTORNEYS

INVENTOR.
THOMAS A. NOVOSEL
BY
Oberlin & Limbach
ATTORNEYS.

United States Patent Office 2,792,728
Patented May 21, 1957

2,792,728
COUNTER-CUTTING TOOL

Thomas Novosel, University Heights, Ohio, assignor to The Cleveland Twist Drill Company, Cleveland, Ohio, a corporation of Ohio Application May 13, 1955, Serial No. 508,201

4 Claims. (Cl. 77—73.5)

This invention relates as indicated to counter-cutting tools. It is recognized that the term "counter-cutting" is not usually employed in the tool industry in describing a particular type of tool. This term is being used, however, in the following description of this invention as a term which includes countersinks as well as counterbores. Since both of these tools are cutting tools and differ from each other largely in the inclination of the cutting edges to the longitudinal axis of the tool, it is believed proper for purposes of convenience to use the term "counter-cutting" as a term which includes both of these well-recognized classes of tools.

It is a principal object of this invention to provide a counter-cutting tool construction which is simple to manufacture and thus can be produced at relatively low cost and which will give superior performance with a minimum of chattering.

Other and more particular objects of the invention will appear as the description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 3:
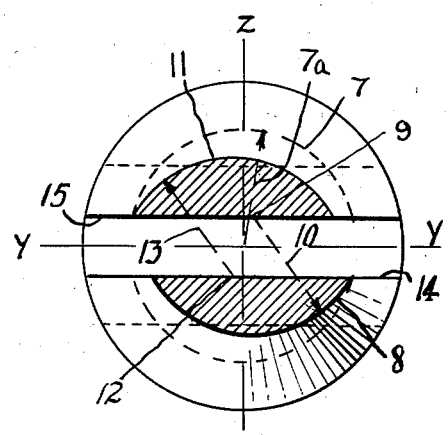
Fig. 3 is a transverse section substantially on line 3'—3' of Fig. 1.

With respect to Figs. 1 to 4 inclusive, it will be noted that these are drawn to a substantially large scale in order to clearly illustrate the various features which characterize the tools of the present invention. While the range of sizes in which tools of this type are made will include sizes on the order of those illustrated by Fig. 1 in full scale, nevertheless, usually the major proportion of tools of this kind would be made in sizes smaller than those illustrated in Figs. 1 to 4. Regardless of the size, however, the relative proportions of the various parts of the tool would be as illustrated in the drawings. While the tools of Figs. 1 to 4 inclusive are not shown provided with a driving and supporting shank, nevertheless as most clearly illustrated in Fig. 5, tools of this kind are usually provided with a driving and supporting shank, the diameter and length of which is more or less standard so as to be accommodated by the machine and hand tools in which countersinks of this character are customarily employed. These could be for example taper shanks, threaded shanks or bitstock shanks. It should be noted that while this tool is described as a countersinking tool it may also be useful as a deburring tool or a counterboring tool.

Figure 1:
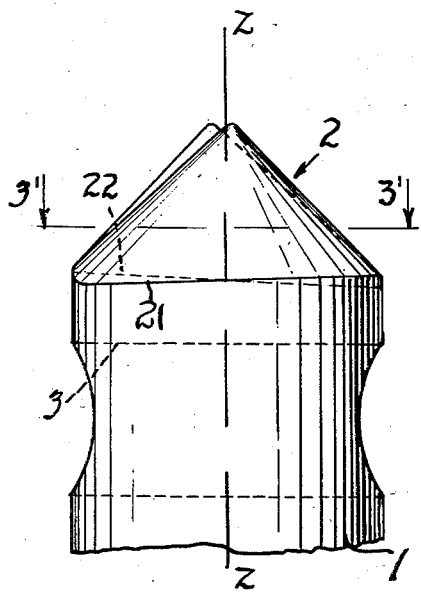
Fig. 1 is a side elevation drawn to an enlarged scale of a portion of a countersinking tool constructed in accordance with the principles of this invention.
Figure 2:
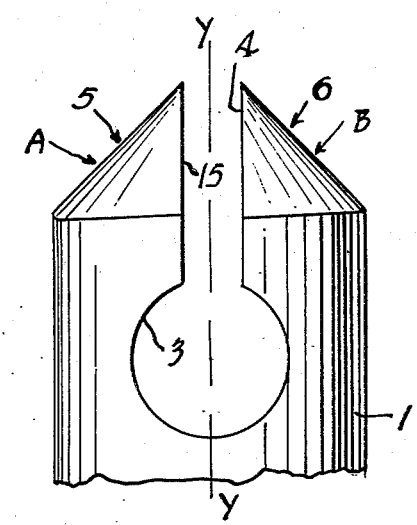
Fig. 2 is a side elevation of the tool illustrated in Fig. 1 taken at right angles to the plane of Fig. 1.

Referring now more specifically to the drawings and more especially to Figs. 1 and 2, there is here illustrated the point and adjacent end of a countersinking tool constructed in accordance with the principles of this invention. The main body portion 1 of the tool is of one-piece construction and is substantially cylindrical in form and has formed on the end thereof the point generally indicated at 2. Throughout the following description and in the appended claims wherein references may be made to the "point" of the tool, it is intended by this term to denote the entire operating end of the tool rather than only the extreme forward apex of the tool. This is a common nomenclature in the tool industry.

The body 1 is provided with an aperture 3 extending transversely therethrough and arranged to facilitate the escape of chips from the slot 4. While the simplest form of this aperture is cylindrical as shown, it could be of such shapes as elliptical, square or rectangular, as desired. The aperture may also be countersunk on both sides as shown in Fig. 7 or it may be anguluarly placed as in Fig. 6.

Extending forwardly from the aperture 3 through the point of the tool is a slot generally indicated at 4, which divides the point of the tool into two principal parts generally indicated at 5 and 6 in Fig. 2. While the slot is here shown to have parallel sides, it is recognized that the sides could be tapered, increasing in width toward the aperture.

The point of the tool is generally coniform, that is, it has the appearance of a cone although as explained hereinafter in greater detail, it is not a true cone.

The portions 5 and 6 may be described as being substantially sections of right cones A and B respectively, the axes of which respectively lie equi-distantly on opposite sides of the center plane Y—Y of the slot 4 and also equi-distantly on opposite sides of a plane Z—Z which includes the axis of the tool and is at right angles to said center plane Y—Y of said slot.

This is most clearly illustrated in Fig. 3 wherein the line 7 is a true circle struck from the center or axis of the tool. The radius of the circle 7 is shown at 7a. The line 8 is the line of intersection between the outer periphery or surface of the cone portion 5 with a plane which is at right angles to the axis of the tool. The line 8 has been illustrated in Fig. 3 as an arc of a circle struck from a center 9 through a radius 10. Similarly, the line 11 is a line of intersection between the outer surface or slope of the cone portion 6 and a plane which is normal to the axis of the tool. The outer surface 11 in Fig. 3 has been illustrated as a segment of a circle whose center is at 12 and a radius of which is illustrated by the line 13. Thus, it will be seen that the arcs 8 and 11 may be said to be lines lying on the surface of right cones A and B whose vertical axes are respectively at 9 and 12 which may fall either on or within the confines of the surfaces of the slot. From an inspection of Fig. 3, it will be observed that these vertical axes 9 and 12 are as previously indicated on opposite sides of the center plane Y—Y of the slot 4 and also equi-distantly on opposite sides of plane Z—Z which includes the axis of the tool and is also at right angles to said center plane Y—Y of said slot.

Figure 4:
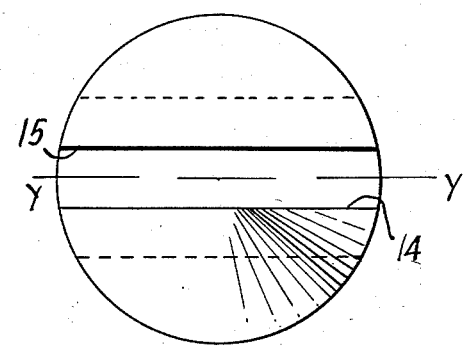
Fig. 4 is a view of the cutting end of the tool illustrated in Fig. 1.

The cutting edges of the tool by which the countersinking operation is performed are denoted by lines 14 and 15 most clearly shown in Figs. 3 and 4, these being actually the intersection between the outer surfaces of the coniform sections 5 and 6 and the planes defining the sides of the slot 4. By having reference to Fig. 3, it will be noted that this arrangement provides clearance behind the cutting edges 14 and 15 which would not be the case if the lines 8 and 11 were arcs of circles whose center coincided with the axis of the tool, i. e. if the lines 8 and 11 lay on the circle 7. As most clearly shown in Fig. 1, the lines 21 and 22 which are respectively the lines of intersection between right cones A and B and the cylindrical outer surface of the body 1 are not at right angles to the longitudinal axis of the tool due to the fact that the axes of said cones A and B, while parallel to the longitudinal axis of the tool, lie on opposite sides of and are spaced, preferably by equal amounts, from the plane Z—Z. The axes of cones A and B also lie on opposite sides of and are spaced by equal amounts from the plane Y—Y. This angular divergence of lines 21 and 22 illustrates the lip relief or clearance behind the cutting edges 14 and 15 provided by the sections 5 and 6 of right cones A and B as shown in Fig. 3. This relief or clearance is commonly measured as the angle between the circumference of the cylindrical portion at a 90° angle to the axis and passing through the cutting edge and a tangent to the portion of the arc passing from the outer corner of the cutting edge to the outer corner of the heel of the point.

This method of providing clearance enables resharpening of the tool to be done on the right cone surfaces as well as on the walls of the slots which is desirable because more resharpenings are possible. If resharpening is done on the walls of the slot only, the slot soon becomes too wide for efficient service. For the most accurate work it is desirable to resharpen on both the slot walls and the right cone surfaces.

Figure 5:
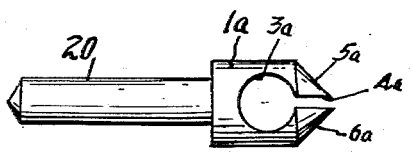
Fig. 5 is a side elevational view of a modified form of a countersinking tool constructed in accordance with this invention.

The modification illustrated in Fig. 5 differs from the previously-illustrated and described forms of construction in respect of the location of the aperture or cylindrical opening 3a. In the modification illustrated in Fig. 5, the opening 3a is so close to the point of the tool that the slot intersects the cylindrical opening 3a at the base of the coniform point. Ordinarily, the location of the cylindrical opening 3 as illustrated in Fig. 2 is preferred since this makes possible a resharpening of the tool a greater number of times before it is rendered useless.

As previously described, Fig. 5 shows the provision of a shank 20 secured to the cylindrical body 1a and by which shank the countersinking tool may be supported and driven.

Figure 6:
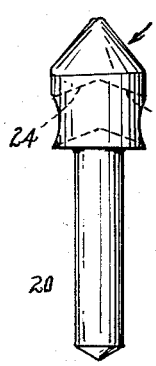
Fig. 6 is a side elevational view of another modified form of a countersinking tool constructed in accordance with this invention in which the characterizing transverse aperture consists of two holes whose axes are angularly related and intersect at the axis of the tool.
Figure 7:
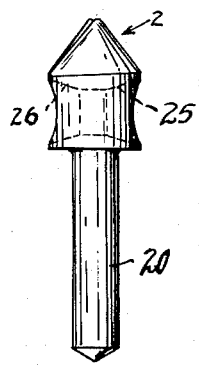
Fig. 7 is a side elevation of still another modified form of a countersinking tool constructed in accordance with this invention in which the transverse aperture is countersunk on both ends.

The modification illustrated in Fig. 6 differs from the previously-illustrated and described forms of construction in respect to the aperture which here consists of two holes 23 and 24 which extend angularly to the axis of the tool and intersect at said axis. This construction favors the escape of chips from the slot.

The modification illustrated in Fig. 7 differs from the previously-illustrated and described forms of construction in respect to the aperture which here has been countersunk or flared out on both sides as shown at 25 and 26 thus providing additional space for the escape of chips.

Figure 8:
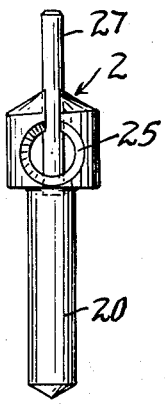
Fig. 8 is a side elevation of still another form of a countersinking tool constructed in accordance with this invention in which it is provided with a pilot.
Figure 9:
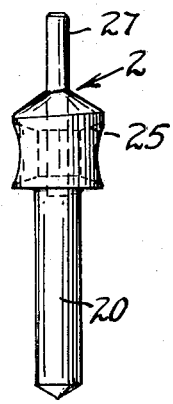
Fig. 9 is a side elevation of the tool illustrated in Fig. 8 taken at right angles to the plane of Fig. 8.

The modification illustrated in Fig. 8 and of which a side view is shown in Fig. 9, while generally similar to that shown in Fig. 7, is, however, provided with a cylindrical opening axially in the head thereof in which is positioned a cylindrical pin 27 which, projecting beyond the end of the point of the tool, serves as a pilot to assist in centering the countersinking tool more accurately so that a more accurate countersunk surface will be produced.

Figure 10:
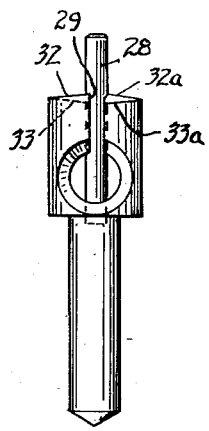
Fig. 10 is a side elevation of a tool similar to Fig. 8 but with the cutting edges at right angles to the axis of the tool making it in effect a counterbore.
Figure 11:
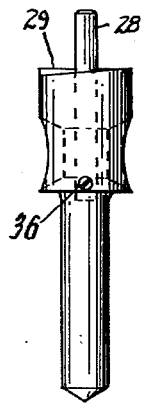
Fig. 11 is a side elevation of the tool illustrated in Fig. 10 taken at right angles to the plane of Fig. 10.

It is contemplated in the use of the countersinking tool of this invention that the angle of the cutting edges to the axis Z—Z, as viewed for example in Figs. 1 and 2, may be varied according to the need of the operation being performed. In Fig. 1 this angle is shown as about 41° but can be varied from about 20° to about 90° as is shown in Figs. 10 and 11. When this angle becomes 90°, the countersinking tool becomes in effect a counterbore.

Figure 16:
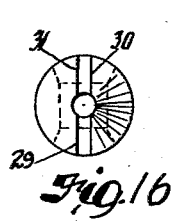
Fig. 16 is an end view of the tool shown in Figs. 10 and 11.

The tool shown in Figs. 10 and 11 similarly to the modification illustrated in Figs. 8 and 9, utilizes a pilot such as 28 which is supported in a cylindrical opening which extends centrally from the point of the tool into the body thereof. The end view of the modification illustrated in Figs. 10 and 11 is shown in Fig. 16 and illustrates the arrangement of the cutting edges 29 and 30 for operation as a right-hand tool. The cutting edges 29 and 30 lie on chords of the circle formed by a right section of the tool and are, of course, each provided with clearance so that the upper surface of the end of the point which lies between the cutting edge 29 and the trailing edge 31 slopes away from the plane of the drawing as viewed in Fig. 16 and as shown by the full line 32 and the dotted line 33 in Fig. 10. That is, the outer end of the point shown in Fig. 10 which lies to the left of the pilot slopes rearwardly and downwardly from the cutting edge 29. On the other hand, the outer end surface of the point which lies to the right of the pilot 28 slopes in such a way that the line 32a is higher than the line 33a forwardly toward the viewer as viewed in Fig. 10. The pilot whether it be plain as at 28 or a drill as at 34 may be secured in the body of the tool by conventional means such as brazing or by a removable connection such as is provided by the set screw 36 shown in Fig. 11.

Figure 12:
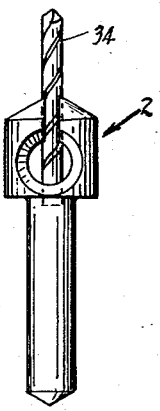
Fig. 12 is a side elevation of a tool similar to Fig. 8 but with a drill instead of the pilot making the tool in effect a combined drill and countersink.
Figure 13:
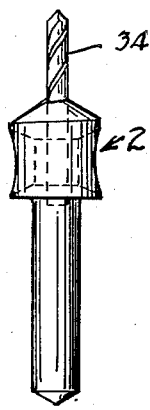
Fig. 13 is a side elevation of the tool illustrated in Fig. 12 taken at right angles to the plane of Fig. 12.

The modification illustrated in Figs. 12 and 13 is generally similar to the modification illustrated in Figs. 8 and 9. However, the form of Figs. 12 and 13 employs a twist drill held in the cylindrical opening in the point of the tool so that such twist drill as generally indicated at 34 may effect a drilling operation simultaneously with the countersinking operation performed by the countersinking head generally indicated at 2.

Figure 14:
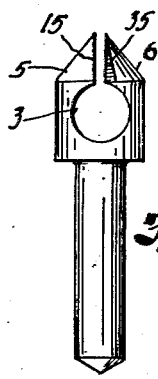
Fig. 14 is a side elevation of a tool which is similar to that shown in Fig. 2 but provided with secondary clearances.
Figure 15:
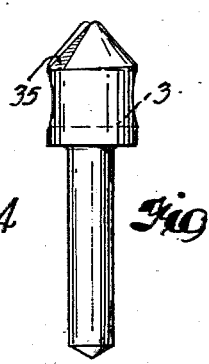
Fig. 15 is a side view of the tool shown in Fig. 14.

In the modification illustrated in Figs. 14 and 15, this form is generally similar to that illustrated in Fig. 5 in respect of the location of the opening through the head, although it is within the contemplation of this invention when forming the modification illustrated in Figs. 14 and 15, to have such opening more remote from the head as for example in the relative position of the opening 3 illustrated in Fig. 2. The modification illustrated in Figs. 14 and 15 employs a secondary clearance generally indicated at 35 which is on the edge of the cone part 6 which faces the cutting edge 15 on the cone part 5. Such secondary clearance is provided in order to facilitate the operation of resharpening by the grinding of the conical surfaces 5 and 6 without endangering the cutting edges 14 and 15 of the tool.

Figure 17:
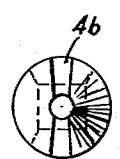
Fig. 17 is an end view of another modified form of construction.

As most clearly illustrated in Fig. 17, it is within the contemplation of this invention also to form the slot 4b with divergent walls so that the slot becomes larger as it progresses radially outwardly from the center of the tool in order to further facilitate the removal of the chips.

The tools of this invention may be made of a type of steel dictated largely by the service for which the tools will be used. If they are to be used in wood, a carbon steel may be sufficient but if they are to be used in metal working, then alloy steels of the kind commonly referred to as high-speed steels should be used. If extremely hard service is to be encountered, it will be, of course, observed that the tools of this invention are admirably suited for the use of the sintered carbides or other hard metal inserts on the cutting edges. It is evident that by reversing the clearances shown in the drawings, the tools can be made to cut left-handed if desired.

All types of the counter-cutting tools of this invention have a good general application in wood. The countersinking types have advantages in deburring and certain types of countersinking in metals, for example, hard aluminum. The counterboring types have advantages as spot facers and shallow hole counterboring in metals.

Other modes of applying the principle of the invention may be employed, change being made as regards the details described, provided the features stated in any of the following claims or the equivalent of such be employed.

I, therefore, particularly point out and distinctly claim as my invention:

1. A counter-cutting tool comprising an integral cylindrical body having a substantially coniform end which is bisected by a diametrical slot extending through said coniform end and into said cylindrical body, the lines of intersection between the sides of such slot and coniform end alternately being cutting edges, the halves of such coniform end on opposite sides of said slot being sections of right cones, the axes of which lie equidistantly on opposite sides of a plane which includes the axis of the tool and extends at right angles to the center plane of said slot, the rearward portion of said slot terminating in an aperture for the escape of chips, said aperture extending diametrically through and being entirely within said cylindrical body.

2. The tool of claim 1 characterized further in that the axes of such sections of right cones also lie equidistantly on opposite sides of the center plane of such slot to thereby increase the clearance angle behind such cutting edges.

3. The tool of claim 1 characterized further in that said body is formed with an axial center hole that intersects the sides of such slot and extends into said body beyond said aperture, pilot means fitted into such center hole to extend axially beyond said coniform end, and means for removably securing said pilot means in such center hole of said body.

4. The tool of claim 1 characterized further in that said aperture has outwardly flared ends to facilitate outward movement of chips from said aperture.

References Cited in the file of this patent

UNITED STATES PATENTS

| | | |
|---|---|---|
| 303,053 | Russell | Aug. 5, 1884 |
| 358,731 | Clark | Mar. 1, 1887 |

FOREIGN PATENTS

| | | |
|---|---|---|
| 105,408 | Great Britain | Apr. 19, 1917 |